United States Patent [19]

Sayles

[11] Patent Number: 5,380,570
[45] Date of Patent: Jan. 10, 1995

[54] THERMOPLASTIC PARA-POLYPHENYLENE SULFIDE, HIGH TEMPERATURE-RESISTANT ROCKET MOTOR CASES

[75] Inventor: David C. Sayles, Huntsville, Ala.

[73] Assignee: The United States of America as represented by the Secretary of the Army, Washington, D.C.

[21] Appl. No.: 86,799

[22] Filed: Jul. 6, 1993

Related U.S. Application Data

[62] Division of Ser. No. 23,443, Feb. 26, 1993, Pat. No. 5,277,868.

[51] Int. Cl.$^6$ .............................................. F02K 9/00
[52] U.S. Cl. ................................ 428/36.4; 428/34.1; 428/35.7; 428/36.92; 428/76; 60/255; 60/204; 206/524.1
[58] Field of Search ............... 428/34.1, 36.4, 35.7, 428/36.92, 76, 220; 60/255, 204; 206/524.1; 220/DIG. 9

[56] References Cited

U.S. PATENT DOCUMENTS

| | | | |
|---|---|---|---|
| 3,141,052 | 7/1964 | Labash, Jr. | 264/219 |
| 3,716,610 | 2/1973 | Goldstein | 264/152 |
| 4,147,819 | 4/1979 | Hukumoto et al. | 427/195 |
| 4,361,526 | 11/1982 | Allen | 264/3 C |
| 4,537,951 | 8/1985 | Idel et al. | 528/388 |
| 4,596,619 | 6/1986 | Marks | 156/171 |
| 5,039,572 | 8/1991 | Bobsein et al. | 428/408 |
| 5,341,638 | 8/1994 | Van Name et al. | 60/204 |

Primary Examiner—Charles R. Nold
Attorney, Agent, or Firm—Anthony T. Lane; Freddie M. Bush; Hugh P. Nicholson

[57] ABSTRACT

Para-polyphenylene sulfide, a non-composite, ultrahigh-temperature-resistant, thermoplastic resin, is employed for the manufacture of interceptor motor cases. The thermoplastic resin, para-polyphenylene sulfide, has a combination of properties which are of particular interest in the fabrication of interceptor rocket motor cases. Para-polyphenylene sulfide in ribbonized forth is wound directly onto the required mandrel and then fused into a solid mass. The fused, solid mass has the properties which enables it to serve as both insulator and motor case material. The manufacture of a combination insulated motor case is achieved by the following method: The equipment, first, involves the fabrication of a breakout mandrel by one of several methods. The para-polyphenylene sulfide is ribbonized by extrusion and wound down on the breakout mandrel to the required thickness and fused into a solid mass by heating to its melt temperature of about 285° C. The breakout mandrel is removed to release the interceptor rocket motor case which functions as both insulator and interceptor rocket motor case material.

3 Claims, 1 Drawing Sheet

THERMOPLASTIC PARA-POLYPHENYLENE SULFIDE, HIGH TEMPERATURE-RESISTANT ROCKET MOTOR CASES

DEDICATORY CLAUSE

The invention described herein may be manufactured, used, and licensed by or for the Government for governmental purposes without the payment to me of any royalties thereon.

CROSS REFERENCE TO RELATED APPLICATION

This is a division of application Ser. No. 08/023,443, filed Feb. 26, 1993, now U.S. Pat. No. 5,277,863, issued Jan. 11, 1994.

BACKGROUND OF THE INVENTION

Insulation is generally required to protect a rocket motor case from the hot corrosive gases resulting from the combustion of the solid rocket motor propellant contained within the rocket motor case.

In one conventional process for fabricating and installing the insulator in an interceptor/missile motor, if required, the steps described below are employed. The function of the insulator is to provide thermal protection to the motor case. The process is time consuming and costly because the insulator is prepared in three segments, namely, the forward dome insulator, the aft dome insulator, and the motor case side wall insulator. The forward and aft dome insulators are laid up in female molds using calendered sheets of insulator to obtain the required thickness. Several different thicknesses are required to provide the insulative requirements, and are predominantly influenced by the combustion flame temperature of the propellant and its internal grain configuration. The insulation segments are cured, then the forward and aft dome insulators are bonded into the motor case using an adhesive. The center section of the insulator is next laid up. A bladder is inserted into the motor case and inflated. The bladder pushes the insulation up tightly against the interior of the motor case. The center insulation is then cured, and the bladder is removed. The propellant casting mandrel is inserted, and the propellant cast into the insulated motor.

U.S. Pat. No. 4,596,619, which was issued to John D. Marks on Jun. 24, 1986, discloses apparatus and another method of making an elastomer lined composite vessel having a dome-like shape. This method employs a thin, tacky ribbon comprising elastomer which an applicator moving relative to the rotational axis of a rotating mandrel causes integral segments of ribbon to adjacently position and tack together on the surface of the mandrel thereby covering the mandrel, including the dome-like shaped portion. Filament winding a casing comprising filaments and thermosettable resin around the elastomer layer is next completed, and the thermosettable resin and elastomer layer is cured to yield a composite vessel.

Thus, composite vessels and composite rocket motor cases as presently constructed require resin preparation, fiber impregnation, or debulking and compaction of wound structures when filament is employed. In most structures requirements for external and internal motor case insulation exist. Thermosetting resins, such as epoxy resins, are employed in various processes. When the thermosetting resins are polymerized during curing, they cannot be softened, recovered, and recycled. Therefore, the presently used materials are not attractive for recycling as they must be scrapped. Because of environmental restrictions any materials which are presently scrapped have to be disposed of in an acceptable manner. Disposing of these materials in an acceptable manner whether it be by approved burning or disposing to landfills adds considerable cost to waste disposals since environmental laws place restrictions on disposal operations to guard against polluting the environment.

The desirability of providing a recyclable thermoplastic resin for use in the fabrication of high temperature-resistant rocket motor cases is recognized.

An object of this invention is to provide non-composite, thermoplastic, high temperature-resistant rocket motor cases.

A further object of this invention is the employment of a thermoplastic resin in the fabrication of interceptor rocket motor cases.

Still a further object of this invention is the employment of a thermoplastic resin which serves as both an insulator and an interceptor rocket motor case material.

SUMMARY OF THE INVENTION

The use of a non-composite, ultrahigh-temperature-resistant thermoplastic resin in the manufacture of interceptor rocket motor cases provides a unique approach to achieving improved properties and advantages over conventionally employed thermosetting resins. One major advantage of using the thermoplastic resin of this invention is that this thermoplastic material can be reclaimed and recycled any number of times so there is no waste. Thermosetting resins, such as epoxy resins, once they are polymerized, cannot be softened and recovered but must be scrapped.

The thermoplastic resin of this invention, para-polyphenylene sulfide, has a combination of properties which are of particular interest in the fabrication of interceptor rocket motor cases. The combined characteristics make para-polyphenylene sulfide applicable as a means of replacing the insulation in an interceptor rocket motor. This means that para-polyphenylene sulfide can be fabricated to serve as a combination insulator and rocket motor case. When a rubber insulation is employed, the rubber is ribbonized by extrusion, wound on the mandrel in an uncured state, the para-polyphenylene sulfide is then overwound over the rubber insulation, and the insulator and rocket motor case materials are co-cured in a single step. When no rubber insulator is required, the fabrication technique involves the laying down of para-polyphenylene sulfide to serve as both insulator and rocket motor case material. This fabrication technique obviates the need for the uncured rubber insulator and the extruder system. The para-polyphenylene sulfide is wound directly onto the required mandrel and then heated to its melting point to fuse to a solid mass to form both insulator and interceptor rocket motor case material.

DESCRIPTION OF THE PREFERRED EMBODIMENT(S)

Figure 1:
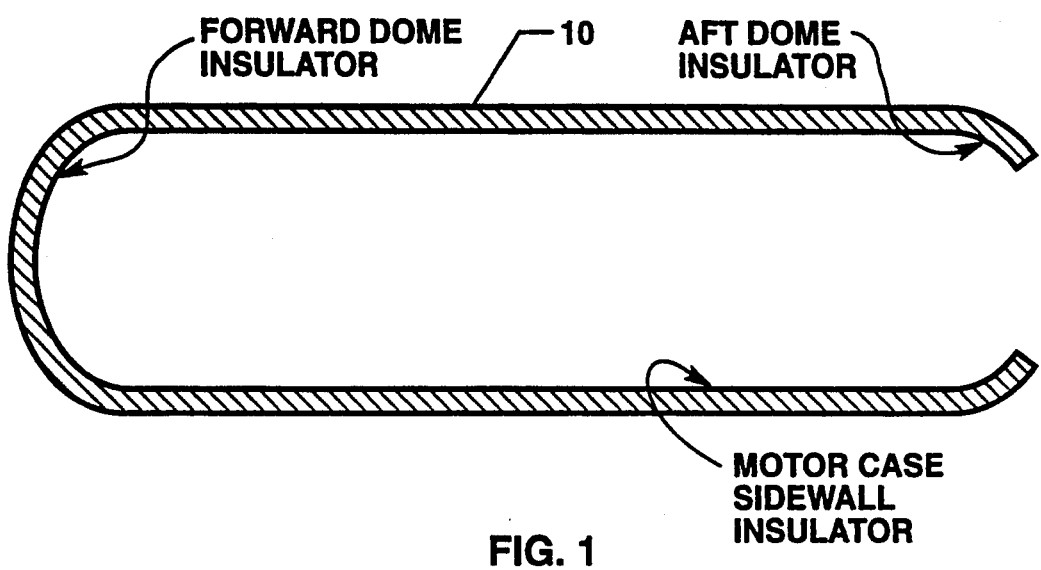
FIG. 1 of the Drawing depicts the location of forward dome, aft (or after) dome, and case sidewall insulation in a conventional rocket motor case.

The method of this invention obviates the requirements for installing the insulation in three segments in a composite intercepter rocket motor case 10, located in FIG. 1, and as described earlier under Background Of The Invention.

Figure 2:
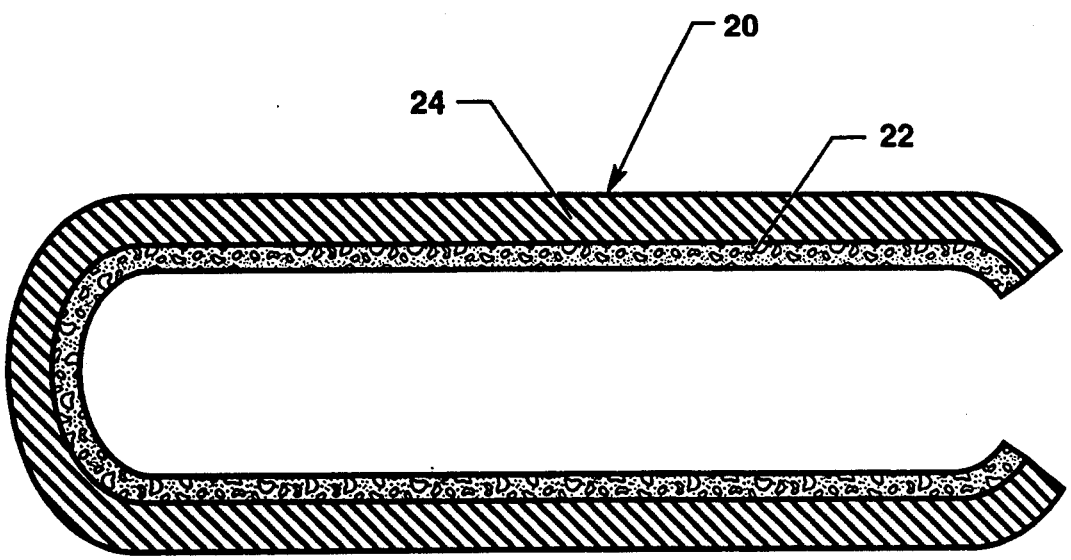
FIG. 2 of the Drawing depicts an in-process composite motor case which shows a thermoplastic resin wound on a breakout mandrel.

The method of this invention for the fabrication of a rocket motor case also obviates the need for the green rubber insulation extruder and applicator apparatus such as illustrated in the prior art. FIG. 2 of the Drawing shows an in-process composite motor case 20 which comprises a thermoplastic resin 24 wound on a breakout mandrel 22.

The manufacture of a combination insulated motor case is achieved by the following methods the equipment, first, involves the fabrication of a breakout mandrel by one of several well known methods. The para-polyphenylene sulfide is ribbonized by extrusion and wound or laid down on the breakout mandrel to the required thickness and fused into a solid mass. The breakout mandrel is removed, and the propellant is cast into the solid mass by conventional casting techniques. Para-polyphenylene sulfide serves as both insulator and motor case material for the rocket motor.

The major difference between the processing steps involved in the fabrication of composite thermoset, graphite filament-reinforced epoxy resin motor cases with non-composite, thermoplastic motor case is presented in Table I below. The thermoplastic formulation does not require resin preparation, fiber impregnation or debulking.

TABLE I

COMPARISON OF THE MOTOR PROCESSING STEPS USED IN THE FABRICATION OF COMPOSITE THERMOSET MOTOR CASES WITH NON-COMPOSITER THERMOPLASTIC MOTOR CASES

| COMPOSITE THERMOSETTING MOTOR CASES | NON-COMPOSITE THERMOPLASTIC MOTOR CASES |
|---|---|
| Resin Preparation | — |
| Fiber impregnation | — |
| Filament Winding | Filament Winding |
| Debulking (Degassing) | — |
| Curing (350°/8 hours) | Heating to Melt Temperature |
| Non-Destructive Evaluation | Non-destructive Evaluation |

TABLE II

| CHARACTERISTICS OF POLYPHENYLENE SULFIDE* | |
|---|---|
| CHARACTERISTICS | VALUE/COMPONENTS |
| Crystallinity Index (%) | = 65 |
| Differential Scanning calorimeter Analysis | = Highly crystalline |
| Heat of Fusion (cal/g) | = 12 |
| Glass Transition Temperature (°C.) | = 85 |
| Crystallization Exotherm (°C.) | = 136 |
| Melting Endotherm (°C.) | = 274 |
| Melting Point (°C.) | = 285 |
| Autoignition Temperature (°C.) | = 590 |
| Solubility | Insoluble in any known solvents below 200°C. |
| Flammability | Non-flammable (does support combustion under normal conditions) |
| Retention of Physical Properties at Elevated Temperatures | Good dimensional stability resistant to moist acidic environments Inherent flame retardancy Thermal stability |
| Chemical resistance | |

*Paraphenylene sulfide manufactured commercially by Phillips Petroleum Co. and marketed under trademark of "Ryton".

Paraphenylene sulfide is prepared commercially by the reaction of paradichlorobenzene and sodium sulfide in a polar solvent at elevated temperature. The product of reaction is converted into a linear, high-molecular weight polymer suitable for fiber melt spinning by employing an alkali metal salt as the polymerization modifier.

The characteristics of poly-paraphenylene sulfide which are of particular interest in the fabrication of interceptor motor cases are enumerated in Table II. Of special attractiveness is: (a) its insolubility in any known solvents below 200° C.; (b) its non-flammability; (c) its non-support of combustion under normal conditions; (d) its inherent flame retardancy; and (e) its retention of dimensional stability. These combined characteristics make polyphenylene sulfide also applicable as a means of replacing the insulator in an interceptor motor. This means that it can be fabricated to serve as a combination insulator and motor case.

TABLE III

Attributes of Non-Composite, Thermoplastic Polyphenylene Sulfide Over, Thermosetting Fiber-Reinforced Composite Epoxy Resins in the Fabrication of Motor Cases Need for resin preparation eliminated
Need for fiber impregnation eliminated
Need for external and internal motor case insulations reduced or eliminated
Superior temperature tolerances (700° F. versus 350°
Unlimited potlife
Superior processability
Need for post-cure polymerization of pre-polymer eliminated
No fiber damage on unwinding from storage spools
Superior aging characteristics
Suitable for fiber melt spinning The polyphenylene sulfide fiber properties are set forth below in Table IV.

TABLE IV

| Polyphenylene Sulfide Fiber Properties | |
|---|---|
| Property | Value |
| Elongation (%) | 25–35 |
| Elastic Recovery (%) | |
| 2% extension | 100 |
| 3% extension | 96 |
| 10% extension | 86 |
| Moisture Regain (%) | 0.6 |
| Density (g/cc) | 1.38 |
| Melting Point (°C.) | 285 |

TABLE IV-continued

Polyphenylene Sulfide Fiber Properties

| Property | Value |
| --- | --- |
| Limiting oxygen Index | 35 |

TABLE V

Equipment Used In The Fabrication of Pressure Bottles

Impregnator
Filament Winding Machine
Autoclave
Non-Destructive Testing Facility
Tooling Equipment for the Fabrication of the Winding Mandrels Hydroburst testing of ASTM 5.75-inch diameter pressure bottles is usually the principal means of evaluating the performance capability to be expected in composite motor cases. The function of the burst-tests is to evaluate burst strength of the pressure bottle and the effect of resin properties, such as, stress/strain and fracture toughness.

The 5.75-inch diameter pressure bottle is based on the ASTM standard D-2585 pressure vessel. The composite bottle has a inside diameter of 5.75-inches, an overall length of 9.73-inches and composite polar openings of 1.344-inches at both ends. The bottle is polar wound at an angle of 10.75°. The polars are wound in two layers, with two 1K tows in a 0.15-inch band. The hoops are wound in six plies with a single 6K tow in a 0.065 band. The design fiber strengths are 350-psi in the hoops and 315-ksi in the polar fibers at 4200-psi internal pressure.

The hydrotest procedure is comprised of the following: (a) Test closures were installed into the polar openings of the pressure bottles; (b) ten strain gages were installed on each subscale pressure bottle to monitor the results; (c) the bottles were filled with water; (d) the entrapped air was bled from the system; (e) the bottle was proof-tested to the specific operating pressure of approximately 3500 psi and held for 1 minute; (f) the pressure was released; and (g) and the water was drained from the bottle.

After proof-testing, the bottle was loaded with a propellant charge, and the charge was fired. The pressure at burst was measured. The burst test results are presented in Table VI.

TABLE VI

Hydroburst Data on (5.75-Inch Diameter Pressure Bottles (at 77° F.)

| Characteristics | Composite Thermoset Pressure Bottle | Non-Composite Thermoplastic Pressure Bottle |
| --- | --- | --- |
| Matrix Resin Type | Epoxy | Polyphenylene Sulfide |
| Matrix Resin | LR 100-692* | Ryton** |
| Filament Winding Method | Wet | Dry |
| Graphite Fiber Type | IM-6 | None |
| Stress Ratio | 90:10 | 90:10 |
| Hydroburst Pressure (psi) | 6610 | 7500 |
| Hoop Stress (ksi) | 696 | 749 |
| Pressure X Volume/Weight (PV/W) | 1.41 | 1.52 |
| Mode of Failure | Hoop | Hoop |
| Test Temperature (°F.) | 77 | 77 |

*IR-100-692 epoxy manufactured by Hysol Chemical Company.
**Ryton is a trademark of paraphenylene sulfide manufactured by Phillips Petroleum Co.

The hydroburst data that was obtained in a comparison test for a composite thermosetting epoxy resin system and a non-composite thermoplastic polyphenylene sulfide system are presented in Table VI. The thermoplastic pressure bottle was found to be considerably superior to the thermosetting pressure bottle. The test results were 7500 psi for the thermoplastic as compared to 6610 psi for the thermosetting.

The polyphenylene sulfide polymers can also be reinforced with various filaments to produce engineering thermoplastics resins, of widely differing characteristics, for motor case manufacture. A preferred filament is graphite which is commercially available as IM-7 from Hercules, Inc. However, in this instance, unreinforced polyphenylene sulfide filaments were used without any reinforcement.

I claim:

1. An ultrahigh-temperature-resistant, thermoplastic interceptor rocket motor case manufactured by the method comprising:
   (i) providing a breakout mandrel of the required dimensions and shape;
   (ii) winding or laying down layers of ribbonized para-polyphenylene sulfide of the required thickness on the outer surface of said breakout mandrel;
   (iii) heating said ribbonized para-polyphenylene sulfide to a temperature to achieve melting and fusing of said para-polyphenylene sulfide into a solid mass to form said interceptor rocket motor case consisting of said solid mass of fused para-polyphenylene sulfide which serves as both insulator and interceptor rocket motor case material; and,
   (iv) removing said breakout mandrel to release said interceptor rocket motor case consisting of said solid mass of fused para-polyphenylene sulfide, said solid mass of fused para-polyphenylene sulfide serving as both insulator and interceptor rocket motor case material.

2. The ultrahigh-temperature-resistant, thermoplastic interceptor rocket motor case as defined in claim 1, wherein said solid mass of fused para-polyphenylene sulfide is in the form of a 5.75-inch diameter pressure bottle which is burst tested to a hydroburst pressure of 7500 psi., said hydroburst pressure of 7500 psi. being the test data for said fused para-polyphenylene sulfide as compared to test data for a 5.75-inch diameter pressure bottle comprised of a composite thermosetting epoxy resin burst tested to a hydroburst pressure of 6610 psi.

3. The ultrahigh-temperature-resistant, thermoplastic interceptor rocket motor case as defined in claim 1 wherein said layers of ribbonized para-polyphenylene sulfide wound or laid down on the outer surface of said breakout mandrel are reinforced with graphite filaments.

* * * * *